United States Patent [19]

Belush et al.

[11] 4,161,165
[45] Jul. 17, 1979

[54] PISTON FOR AN INTERNAL COMBUSTION ENGINE

[75] Inventors: Richard Belush; James A. Wade, both of Columbus, Ind.

[73] Assignee: Cummins Engine Company, Inc., Columbus, Ind.

[21] Appl. No.: 770,109

[22] Filed: Feb. 18, 1977

Related U.S. Application Data

[63] Continuation-in-part of Ser. No. 586,895, Jun. 16, 1975, abandoned.

[51] Int. Cl.² .............................. F02F 3/02; F16J 1/04
[52] U.S. Cl. ................................. 123/193 P; 92/235; 92/237
[58] Field of Search .............. 123/193 P; 92/232, 235, 92/237

[56] References Cited

U.S. PATENT DOCUMENTS

| 975,301 | 11/1910 | Talbot | 92/208 |
|---|---|---|---|
| 1,294,833 | 2/1919 | Ricardo | 92/235 |
| 1,377,438 | 5/1921 | Ricardo | 92/237 |
| 1,774,396 | 8/1930 | Noble | 92/237 |
| 2,802,707 | 8/1957 | Day | 92/237 |
| 3,703,126 | 11/1972 | Haug | 92/186 |
| 3,906,924 | 9/1975 | Elsbett | 123/193 P |
| 3,987,709 | 10/1976 | Day | 92/232 |

Primary Examiner—Charles J. Myhre
Assistant Examiner—David D. Reynolds
Attorney, Agent, or Firm—Merriam, Marshall & Bicknell

[57] ABSTRACT

This disclosure deals with a reciprocating piston for an internal combustion engine, particularly for a diesel engine. The piston is made of a relatively high strength metal such as iron, and no more material is used than is necessary to withstand the thermal and mechanical loads encountered in use. A circular piston dome is supported by a support part which extends between the dome and a pair of piston pin bosses. The bosses also support arcuate side thrust pads. A ring band is connected to the outer periphery of the dome by a connecting part which is relatively thin and flexible. The dome, the ring band and the support part are generally symmetrical about the axis of the piston. The support part is annular in cross section and may be conical, cylindrical, or partly conical and partly cylindrical.

27 Claims, 15 Drawing Figures

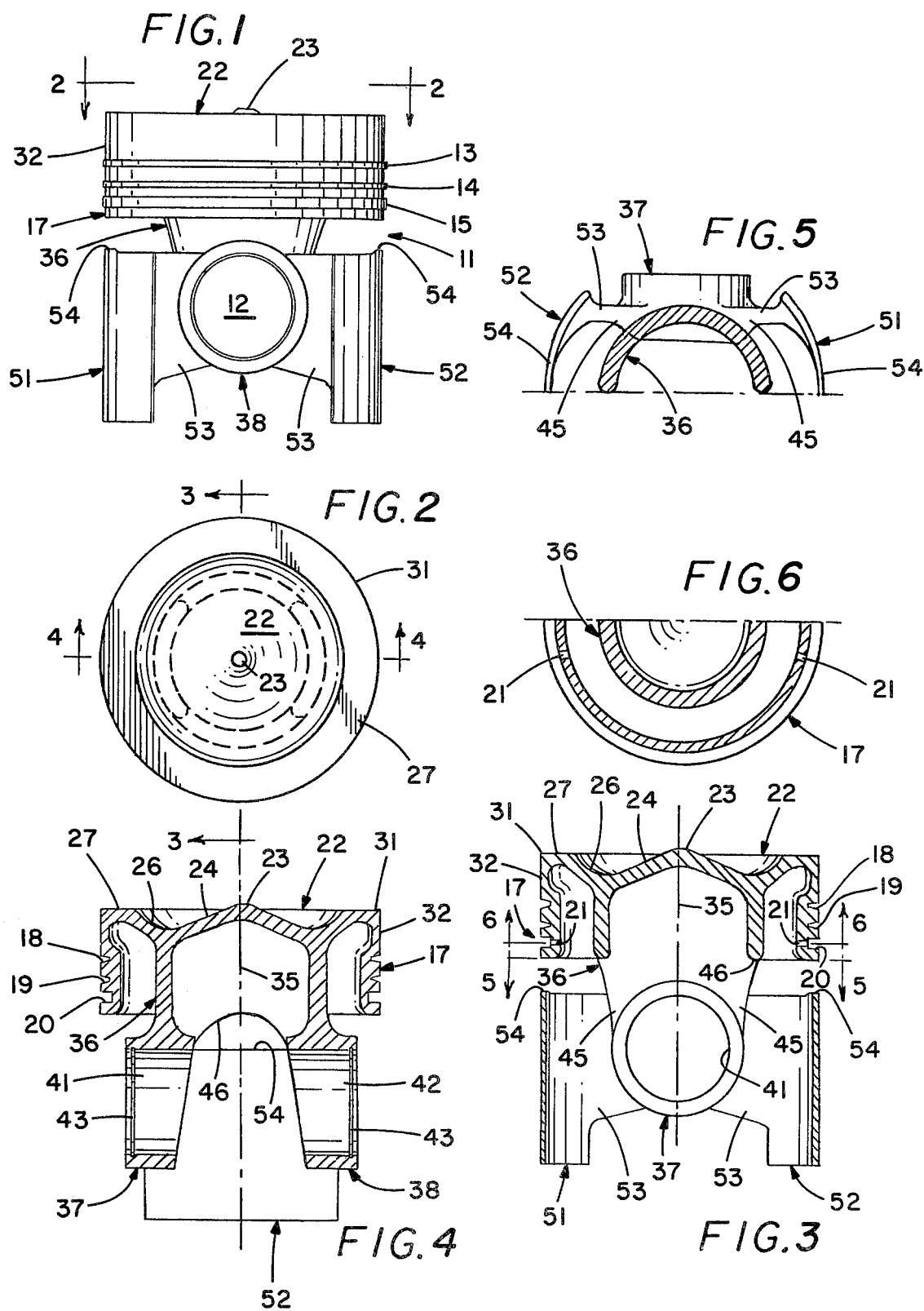

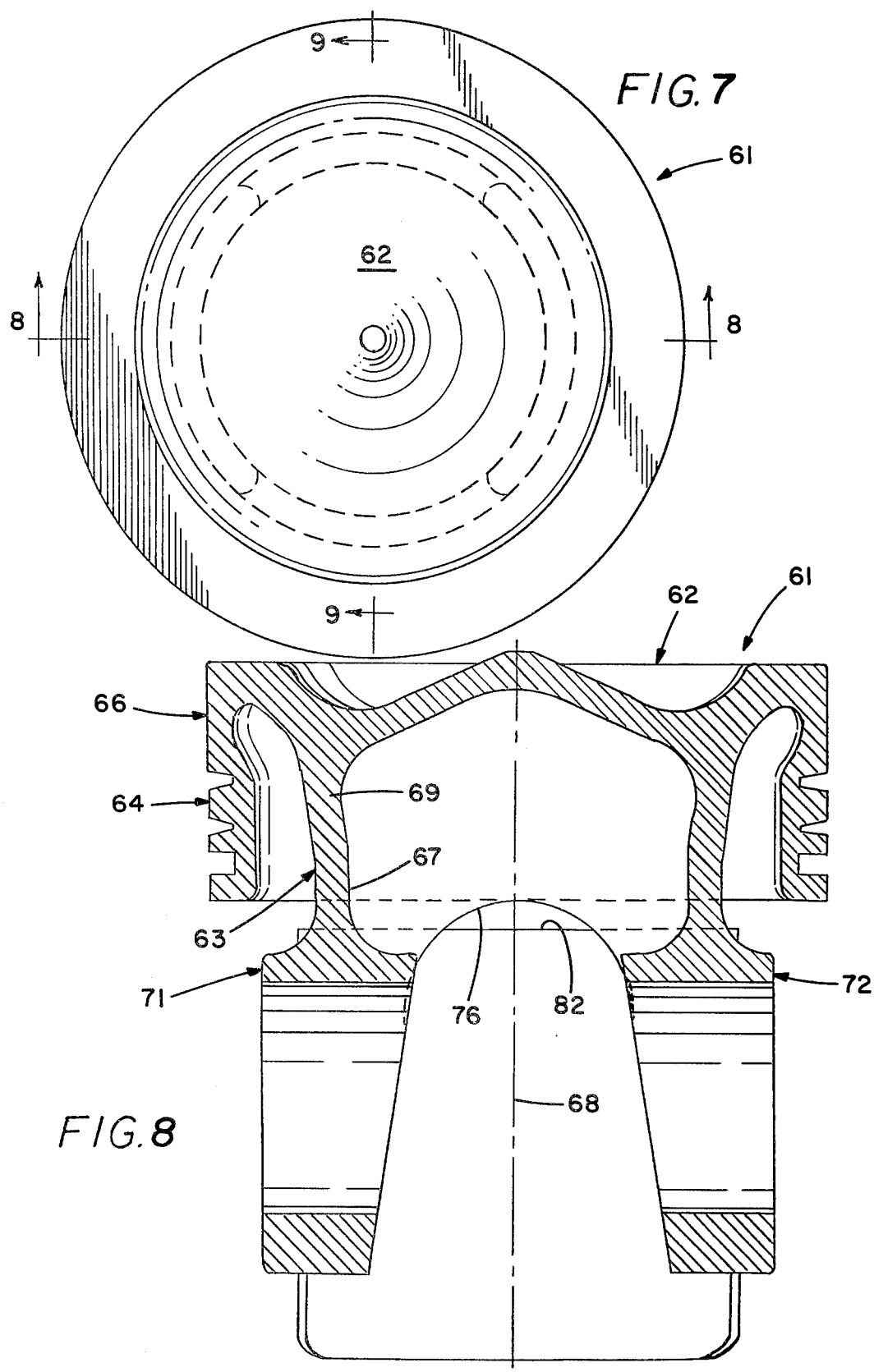

PISTON FOR AN INTERNAL COMBUSTION ENGINE

This is a Continuation-In-Part application based on Belush et al application Ser. No. 586,895, filed June 16, 1975 now abandoned, and titled Piston For An Internal Combustion Engine.

A type of piston presently in common use in reciprocating piston internal combustion engines is made of aluminum or an aluminum alloy, these materials having been chosen because of their relatively low weight for a given size. Such pistons, however, have an excessive rate of failure consisting mainly of cracks around the rim. This type of failure is the result of high piston temperatures and stresses, and these problems are expected to increase in the future because of the trend toward higher rated engines.

Higher strength materials such as iron have been tried and tested out, with conventional piston designs, such materials have also proven to be unsatisfactory. An iron piston of a conventional design is unacceptable because it weighs too much and because of failure, due to thermal stresses, of the part of the piston which supports the piston top or dome.

It is a general object of the present invention to provide an improved piston design made of a high strength material, which will withstand the mechanical and thermal loads and which, when assembled with piston rings and a piston pin, weighs no more than a comparable conventional assembly including an aluminum or aluminum alloy piston.

A piston in accordance with the present invention comprises a circular dome, a ring band, a flexible heat dam part which connects the outer periphery of the dome to the band, a support part connected to the back side of the dome and spaced radially inwardly from the band, the dome, the band and the support being coaxial, piston pin bosses, the support part also being connected to the bosses and thus supporting the dome on the bosses, and arcuate thrust pads at the sides of the piston, the pads being supported by the bosses. The support part is annular in cross section and forms a rigid symmetrical support for the dome.

The foregoing and other objects and advantages of the present invention will become apparent from the following detailed description taken in conjunction with the accompanying figures of the drawings, wherein:

FIG. 1 is an illustration of a piston assembly incorporating the invention;

FIG. 2 is a view taken on the line 2—2 of FIG. 1;

FIG. 3 is a sectional view taken on the line 3—3 of FIG. 2;

FIG. 4 is a sectional view taken on the line 4—4 of FIG. 2;

FIG. 5 is a fragmentary sectional view taken on the line 5—5 of FIG. 3;

FIG. 6 is a fragmentary sectional view taken on the line 6—6 of FIG. 3;

FIG. 7 is a view similar to FIG. 2 but illustrating another piston design in accordance with the invention;

FIG. 8 is a sectional view taken on the line 8—8 of FIG. 7;

Figure 11:
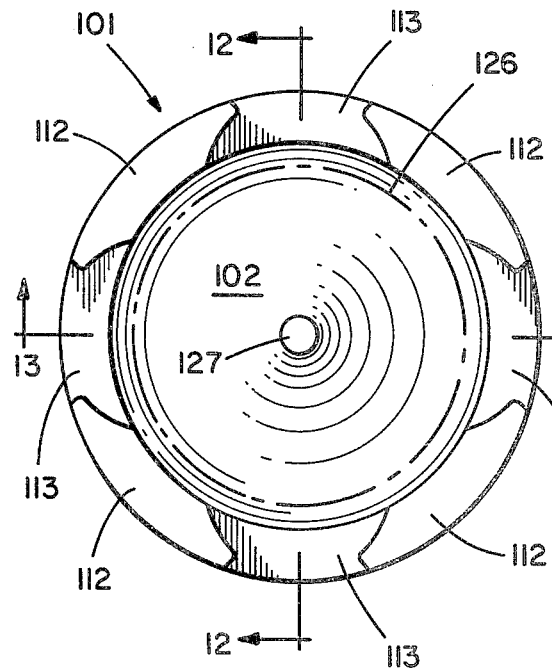
FIG. 11 is a view similar to FIG. 2 but illustrating another piston design in accordance with the invention.
Figure 13:
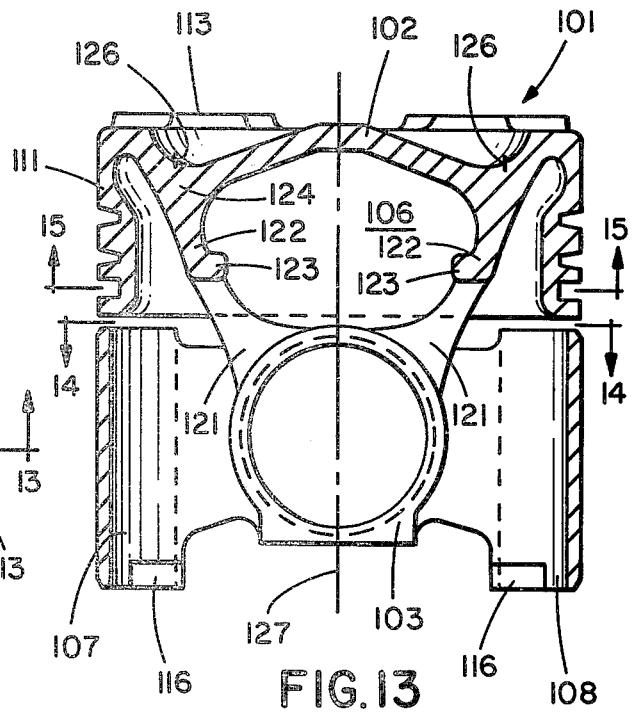
Figure 12:
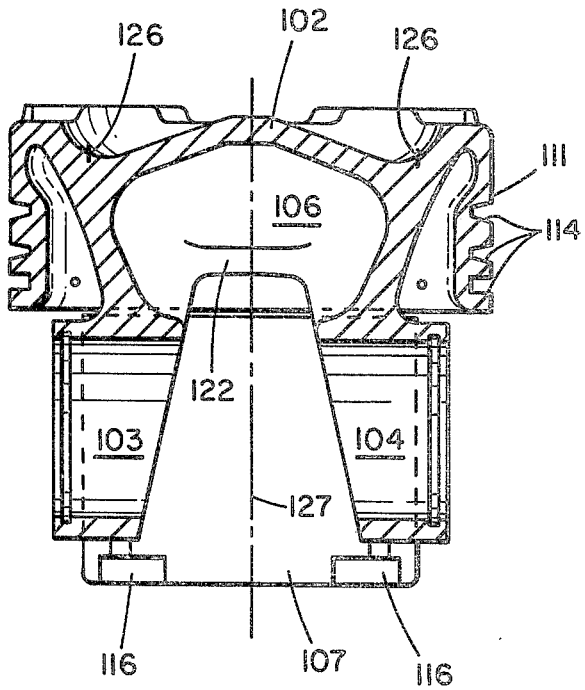
Figure 14:
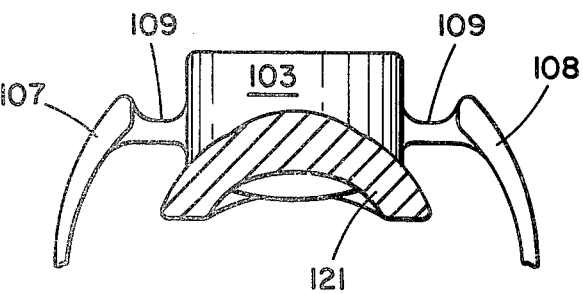
Figure 15:
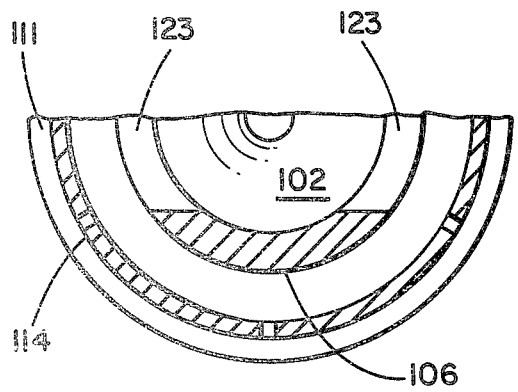

FIGS. 12 and 13 are sectional views taken on the lines 12—12 and 13—13 of FIG. 11; and FIGS. 14 and 15 are sectional views taken on the lines 14—14 and 15—15 of FIG. 13.

With specific reference to FIG. 1, an assembly is illustrated comprising a piston 11, a piston pin 12 for connecting the piston 11 to a connecting rod (not shown) of the engine, and three piston rings 13, 14 and 15. The three piston rings are positioned in annular grooves 18, 19 and 20 (FIGS. 3 and 4) formed in a cylindrical ring band 17 of the piston 11, the two piston rings 13 and 14 being compression-type rings and the ring 15 being an oil ring. Oil drainage holes 21 (FIGS. 3 and 6) are formed through the band 17 at the bottom of the oil ring groove 20.

With reference to FIGS. 2, 3, and 4, the piston 11 further comprises a dome 22 at the top of the piston. The upper or front surface of the dome 22 faces a combustion chamber of the engine and is subjected to downwardly directed forces during operation of the engine, as is well known in the art. In addition to the mechanical loads, the dome 22 is also subjected to thermal loads due to the combustion process in the chamber. The dome 22 is circular and as defined herein, it extends to the outer and upper corner 31 of the piston. At the center of the dome 22 is a small circular area 23 (FIG. 2), and from the area the dome 22 slopes or tapers downwardly and radially outwardly in the area indicated by the reference numeral 24, and then curves upwardly and radially outwardly in the area indicated by the numeral 26. An annular peripheral portion 27 of the dome portion 22 is between the portions 26 and 31, and it will be noted that the level of the center area 23 is slightly above the level of the peripheral portion 27.

The foregoing described configuration of the upper surface of the dome 22 is designed to disperse fuel injected into the combustion chamber and to cause effective mixing of the fuel and air within the chamber. The injector (not shown) is located axially above the piston 11 and the spray holes of the injector are located just above the center area 23 of the piston.

The ring band 17 is cylindrical in shape as previously mentioned and it is positioned coaxially around the dome 22. The upper end of the band 17 is connected to the periphery of the dome 22 by a part 32. From the outer periphery 31 of the dome 22, the band connecting part 32 extends vertically downwardly, the outer peripheral surface of the connecting part 32 being in the plane of the outer surface of the band 17. The thickness or cross-sectional dimension of the part 32 is relatively thin, thereby giving it some flexibility. The part 32 serves to help seal combustion gases, the flexibility accommodates bending stress due to dome deflections arising from temperature differences between the dome 22 and the band 17, and it serves as a heat dam because its thinness retards the conduction of heat from the dome 22 to the band 17. The band 17 is maintained as distortion free as possible because of the design of the part 32 and because the upper part of the piston is symmetrical about the vertical centerline or axis 35 of the piston.

The dome 22, the part 32 and the band 17 are supported by a support part 36 which is coaxial with the dome 22 and the band 17. In the form of the invention shown in FIGS. 1 to 5, the support part 36 is generally cylindrical. As shown in FIGS. 3, 4 and 6, the support part 36 is spaced radially inwardly from the band 17 and extends downwardly from the backside, or underside, of the dome 22. At its lower edge, the support part 36 merges with two piston pin bosses 37 and 38. The two bosses 37 and 38 are laterally spaced on opposite sides of the piston axis 35, and the bosses 37 and 38 have aligned piston pin holes 41 and 42 formed therein. The axis of the holes 41 and 42 is transverse of the piston axis 35, and the holes 41 and 42 receive the piston pin 12 mentioned in connection with FIG. 1. Annular grooves 43 may be formed in the inner periphery of the holes 41 and 42 for use in securing the pin 12 of the two bosses 37 and 38.

As is best shown in FIG. 4, the bosses 41 and 42 are relatively close together and their outer ends are spaced inwardly from the outer surface of the band 17. The space between the adjacent ends of the bosses is provided for a connecting rod (not shown) which connects the pin 12 to the crankshaft of the engine. Since the bosses 37 and 38 are relatively close together and have a relatively short lateral dimension, they enable the use of a relatively short piston pin 12, thereby reducing the weight of the overall assembly shown in FIG. 1. The closeness of the bosses 37 and 38 is further advantageous because it reduces the bending stress on the piston pin 12.

As previously mentioned, the support part 36 is cylindrical in the form of the piston shown in FIGS. 1 to 6, and it supports the dome 22 on the two bosses 37 and 38. As shown in FIG. 3, the outer surfaces of the bosses 37 and 38 are circular, and support part 36 extends downwardly across the top and around the sides of the bosses down to approximately the level of the axis of the holes 41 and 42. With reference to FIG. 4, the portions of the part 36 between the bosses 37 and 38, at points displaced 90° from the axis of the openings 41 and 42, have arcuate cut-outs formed therein, the cut-outs being indicated by the reference numeral 46 in FIG. 4. The cut-outs extend from the adjacent ends of the bosses 37 and 38 upwardly to the level of the lower edge of the ring band 17. Thus, the part 36 is completely cylindrical from the dome 22 downwardly to the bosses 37 and 38 with the exception of the two cutouts 46, and the support part 36 extends downwardly around the sides of the two bosses 37 and 38 in the areas indicated by the reference numeral 45 in FIG. 3. Consequently, the upper part of the piston is axisymmetrical, or completely symmetrical about the axis 35 of the piston.

The piston 11 further includes two arcuate skirt portions or thrust pads 51 and 52 which are spaced downwardly from the ring band 17 (FIG. 3). The two thrust pads 51 and 52 are on opposite sides of the piston and extend between the two bosses 37 and 38, and are in the areas where side thrust on the piston is encountered during engine operation. As shown in FIG. 5, the thrust pads 51 and 52 are supported on the bosses 37 and 38 by struts 53 which extend generally transversely of the axis of the holes 41 and 42. As best shown in FIGS. 1, 3 and 5, the struts 53 extend laterally outwardly from the sides of the bosses 37 and 38. The two thrust pads 51 and 52 extend up to closely adjacent the bosses 37 and 38 but do not cover or enclose the ends of the openings 41 and 42. The upper edges 54 of the thrust pads 51 and 52 are spaced downwardly from the band 17 and are approximately in line with the upper edge of the openings 41 and 42. The thrust pads extend downwardly to a level which is well below the lower surfaces of the bosses 37 and 38.

Figures 9, 10:
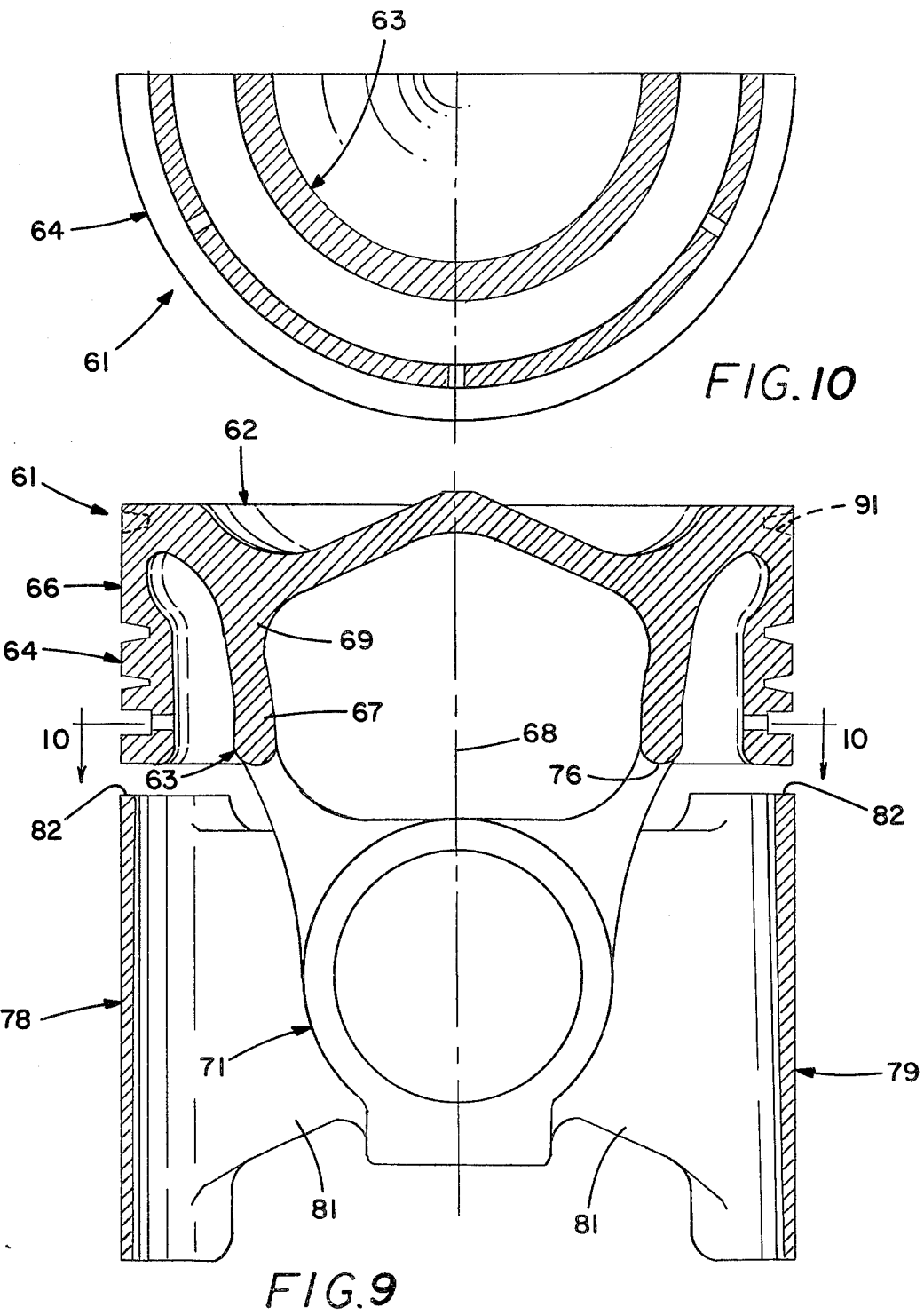
FIG. 9 is a sectional view taken on the line 9—9 of FIG. 7.
FIG. 10 is a fragmentary sectional view taken on the line 10—10 of FIG. 9.

FIGS. 7 through 10 illustrate a piston 61 comprising a dome 62, a dome support part 63, a ring band 64, and a connecting part 66 between the ring band 64 and the outer periphery of the dome 62. The dome 62, the ring band 64 and the part 66 are generally similar to the corresponding parts of the piston shown in FIGS. 1 through 7. The support part 63 however has a larger diameter than the part 36, and it is closer to the ring band. As illustrated in FIGS. 8 and 9, the support part 63 includes a lower generally cylindrical portion 67 which extends parallel to the axis 68 of the piston, and an upper conical portion 69 which tapers upwardly and radially outwardly from the portion 67 to the dome 62. Thus, the support part 63 provides greater support for the outer periphery of the dome 62.

With specific reference to FIG. 8, the piston 61 further includes a pair of piston pin bosses 71 and 72 having aligned piston pin holes 73 and 74 formed therein. The lower end of the support part 63 merges with the upper sides of the two bosses 71 and 72 as shown in FIG. 9. Between the two bosses 71 and 72, an arcuate cut-out 76 is again formed in the lower edge of the support part 63 on each side of the piston.

The piston 61 further includes two arcuate thrust pads 78 and 79 which are supported on the bosses 71 and 72 by struts 81 (FIG. 9). The thrust pads 78 and 79 and the struts 81 are generally similar to the corresponding parts illustrated in FIG. 3, except that the upper ends 82 of the two thrust pads 78 and 79 extend upwardly higher than the thrust pads 51 and 52. As shown in FIG. 9, the upper ends of the thrust pads 78 and 79 extend above the level of the bosses 71 and 72 and are relatively close to the ring band 64. It will also be noted that the thrust pads 78 and 79 have a taper in the vertical direction, the taper being seen in FIG. 9 and being such that the thrust pads 78 and 79 are thinnest at their lower ends. The principal reason for this is that the piston 61 is cast, and the taper makes it easier to remove the cast piston from the mold. In addition, the stresses adjacent the lower ends of the pads are less than adjacent the upper ends, and consequenty, less material is required adjacent the lower ends. In addition to a vertical taper, as shown in FIG. 9, the thickness of the two thrust pads 78 and 79 may also vary in the circumferential direction, with the pads having the greatest thickness where maximum thrust pad load is encountered. This is adjacent the struts as shown in FIG. 5.

Another alternate form of the invention is shown in FIG. 9 which is effective in increasing engine efficiency and/or providing better emission control. A compression ring groove 91 may be provided closely adjacent the upper surface of the dome. In such an arrangement, the uppermost of the three lower piston ring grooves may or may not be eliminated.

FIGS. 11 to 15 illustrate still another form of piston 101 in accordance with the invention, which is the preferred form. The piston 101 comprises a dome 102, two bosses 103 and 104, a support part 106 connecting the dome 102 and the bosses, two arcuate skirts or pads 107 and 108, struts 109 (FIG. 14) connecting the bosses and the skirts, and a ring band 111 formed at the outer periphery of the dome 102. The piston 101 is generally similar to the previously described forms of the piston, and therefore only the differences in construction are described in detail.

The upper surface of the dome 102 has spaced protrusions 112 and recesses 113 formed thereon, and the recesses form valve pockets. The configuration of the upper surface of the dome has a conventional design and does not form part of the present invention.

The ring band 111 contains annular grooves 114 for three piston rings (not shown), and it is generally similar to the previously described ring bands.

The struts 109 extend outwardly from the pin bosses 103 and 104 and are radially outside the support part 106. Cutouts 116 are machined at the lower corners of the skirts 107 and 108. The piston 101 is preferably cast in one piece and then the cutouts 116 are formed and the cutouts serve as chuck-engaging surfaces during further machining operations on the piston.

The support part 106 has a generally conical shape and it extends from the upper side of the bosses 103 and 104 to the backside of the dome 102. As shown in FIGS. 13 and 14, the lower or smaller end 121 of the conical support part 106 merges with the upper sides of the bosses 103 and 104. In the two spaces between the two bosses 103 and 104, the part 106 includes a bridge portion 122 (FIGS. 12 and 13) which arches upwardly a short distance above the upper surface of the bosses 103 and 104. A radially inwardly extending shoe 123 is formed at the lower edge of each bridge portion 122 in order to strengthen the bridge portions. The upper or larger end 124 of the conical support part 106 merges with the back side of the dome 102. The circular line or band 126 (FIGS. 11 and 13) where the part 106 and the dome 102 merge, is approximately seven-tenths the distance from the vertical center line or axis 127 of the piston 101 to the outer periphery. When viewed from above, as in FIG. 11, one-half the area of the dome is within the line 126 and one-half the area is outside the line. Consequently, the part 106 supports the dome 102 at the mid-point of its area.

The piston 101 has a number of advantageous features. First, the conical shape of the support part 106 enables the bosses 103 and 104 to be located close together because of the relatively small diameter of the lower end 121. The bending stress on the piston pin is thereby reduced. Second, the relatively large diameter of the upper end 124 of the support part 106 enables the line 126 to be at the mid-point of the area of the dome. Consequently, the compression load on the upper surface of the dome 102, during the compression load on the upper surface of the dome 102, during operation of the engine, will be evenly divided between the surface areas inside and outside of the line 126. By balancing the loads on both sides of the line 126, the support for the dome 102 is improved and it is stiffened and able to withstand higher cylinder pressures. Third, a cone contains more material than a cylinder, and a cone is naturally more rigid than a straight cylinder. Further, the cone shape results in added material at its upper end and more rigidity near the dome. Fourth, the arch-shape of the bridges 122 and the shoes 123 provide adequate support and rigidity in this area while also providing openings for ventilation and coolant flow through the central volume of the piston.

It will be apparent from the foregoing detailed description and from the drawings that an improved piston construction has been provided. The piston has the least amount of material required to withstand the mechanical and thermal loads encountered during use of the piston, and the piston assembly weight is comparable to an aluminum piston assembly even though the piston is made of a high strength metal. While the forms of the piston described herein are made of a high strength ductile iron and are cast in one piece, it should be understood that the piston could instead be fabricated of higher strength rolled steel stock or from forgings, or a combination of cast parts and other fabricated parts could be used. Further, the dome could be made of a high temperature strength metal, and the other parts could be made of a less expensive metal.

The entire upper part of the piston is axisymmetrical, and consequently the stresses due both to mechanical loads and to thermal loads are nearly symmetrical about the axis of the piston. This produces a more uniform stress distribution and reduces the likelihood of piston failure. The support part provides uniform support for the dome, and it provides a short, direct mechanical load transmission path from the dome to the pin bosses and to the pin. The pin is relatively short, and the support part minimizes the bending movement on the pin by directing the mechanical loads from the dome as close as possible to the connecting rod.

The ring band includes only the amount of material necessary to support the piston rings and its own mass. The ring band is maintained as distortion free as possible because of the axisymmetric upper part of the piston and because of the relatively thin connecting part between the dome and the band. The connecting part serves as a thermal dam because of its relatively thin and long dimensions. This thinness also makes the connecting part relatively flexible which enables it to withstand deflections of the dome which arise from differences between the dome and band temperatures.

Each of the main functioning parts of the piston is constructed to function as independently as possible of the others. The main functioning parts are, of course, the dome, the ring band, the support part, the bosses, and the thrust pads.

While sufficient structural thickness is provided to withstand the stresses, no unnecessary material is used. This is important first because it keeps the weight down and also because the lack of extra or unnecessary material minimizes piston stresses caused by thermal gradients.

Still other advantages over conventional aluminum pistons are that, with the present design, clearances between the piston and the cylinder liner may be reduced in order to lessen piston noise, and the piston ring temperatures are reduced in order to increase ring life and lower oil consumption.

Regarding the diameter of the upper end of the dome support part relative to the dome, the diameter of the support part is preferably such that the amount of dome area it encloses is substantially equal to the amount of dome area outside its diameter as shown in FIGS. 8 to 15.

What is claimed is:

1. A piston for an internal combustion engine, comprising a circular dome, a ring band, a relatively thin flexible heat dam part connecting the outer periphery of said dome to said band, a support part connected to the underside of the dome and spaced radially inwardly from said band, said support part being annular in cross section, said dome, said band, said dam part, and said support part being coaxial and generally symmetrical about the axis of the piston, piston pin bosses, said support part also being connected to said bosses and thus supporting said dome on said bosses, arcuate thrust pads at the sides of the piston, a plurality of struts connecting said pads with said bosses, said pads being supported by said bosses, whereby said dome, said ring band and said pads are substantially structurally separated and structurally function substantially independently of each other.

2. A piston as in claim 1, wherein said piston parts are a one-piece cast construction.

3. A piston as in claim 1, wherein said piston is made of ductile iron.

4. A piston as in claim 1, and further including struts connecting said bosses with said pads and supporting said pads.

5. A piston as in claim 1, wherein said support part has a conical shape.

6. A piston as in claim 1, wherein said support part has a straight cylindrical shape.

7. A piston as in claim 1, wherein the lower portion of said support part has a straight cylindrical shape and the upper portion of said support part has a conical shape.

8. A piston as in claim 1, wherein the connection between said support part and said dome has a diameter such that the area of said dome within said connection is substantially equal to the area outside of said connection.

9. A piston for an internal combustion engine comprising a circular dome, a ring band, a heat dam part connecting the outer periphery of said dome to said band, and a support part connected to the back side of said dome for supporting said dome, said dome extending to the outer periphery of the piston, said dome, said dam part and said support part being coaxial and generally symmetrical about the axis of the piston, and said dam part being thinner than said ring band and said dome and therefore being relatively flexible, said band being structurally supported only by said flexible dam part.

10. A piston for an internal combustion engine, comprising a dome, a dome support part connected to the back side of said dome and extending in one direction from said dome, a ring band coaxial with said dome and spaced in said one direction from said dome, and a band connecting part connecting said band to the outer periphery of said dome, said band connecting part extending in said one direction from said dome and being thinner than said ring band and therefore being relatively thin and flexible, said band being structurally supported only by said flexible connecting part.

11. A piston as in claim 10, wherein the outer peripheries of said dome, said part and said dam are all in the same plane.

12. A piston as in claim 10, and further including a piston ring groove in the outer periphery of said piston closely adjacent the front surface of said dome.

13. A piston for an internal combustion engine, comprising a circular dome, ring support means flexibly connected to the outer periphery of said dome for supporting piston rings, piston pin bosses for connecting said piston to a connecting rod, said bosses having laterally extending bores formed therethrough, a support member connecting said dome with said bosses for supporting said dome on said bosses, said support member being annular in cross section and coaxial with said dome and extending downwardly to said bosses, said dome, said ring support means and said support member being generally symmetrical about the axis of said piston, a plurality of angularly spaced arcuate pads in the spaces between said bosses, and laterally extending struts substantially separate from said support member for connecting said bosses with said pads, said dome, said ring support means and said pads structurally functioning substantially independently of each other.

14. A piston as in claim 13, wherein said bosses and said support member are formed integrally and said support member merges with said bosses.

15. A piston as in claim 13, wherein there are two of said bosses laterally spaced on opposite sides of the axis of said piston, and wherein cut-outs are formed in said support member between said bosses.

16. A piston as in claim 15, wherein radially extending shoes are formed on the lower ends of said cut-outs.

17. A piston as in claim 13, wherein there are two of said bosses laterally spaced on opposite sides of the axis of said piston, said bosses being relatively close together and thereby enabling the use of a relatively short piston pin.

18. A piston as in claim 13, wherein said plurality of arcuate thrust pads extend between and closely adjacent the laterally outer ends of said bosses, and one of said struts connects each of said pads and each of said bosses.

19. A piston as in claim 18, wherein said pads are tapered.

20. A piston as in claim 19, wherein said taper is in the direction of the axis of said piston.

21. A piston as in claim 19, wherein said taper is in the circumferential direction.

22. A piston as in claim 13, wherein the diameter of said support member is such that the area of said dome enclosed by said member is substantially equal to the area of said dome outside of said support member.

23. A reciprocable piston comprising:
a central dome,
a grooved ring band adjacent said dome,
a relatively thin annular part interconnecting said dome and said band,
a pair of spaced piston pin bosses having aligned bores extending therethrough at a right angle relative to the axis of said ring band,
an annular element interconnecting said dome and said piston pin bosses, said element being spaced radially inwardly from said ring band,
said dome, said band, said annular part, and said annular element being substantially symmetrical about the axis of said piston,
a pair of opposed arcuate pads having outer surfaces in approximately the same cylindrical plane as that for said ring band, the mid-point of said pads being positioned generally 90° from the axis of said piston boss bores as viewed in the direction of the axis of said piston; and
struts interconnecting said piston pin bosses and said pads, said struts being substantially separate from said annular element and spaced from said ring band, whereby said dome, said ring band and said pads structurally function substantially independently of each other.

24. A piston as in claim 23, wherein said annular part has a conical shape.

25. A piston as in claim 23, wherein said annular part has a straight cylindrical shape.

26. A piston as in claim 23, wherein the lower portion of said annular part has a straight cylindrical shape and the upper portion of said annular part has a conical shape.

27. A piston as in claim 1, wherein the connection between said annular part and said dome has a diameter such that the area of said dome within said connection is substantially equal to the area outside of said connection.

* * * * *